US007720676B2

(12) United States Patent
Philippe et al.

(10) Patent No.: US 7,720,676 B2

(45) Date of Patent: May 18, 2010

(54) METHOD AND DEVICE FOR SPECTRAL RECONSTRUCTION OF AN AUDIO SIGNAL

(75) Inventors: Pierrick Philippe, Chevaigne (FR); Jean-Bernard Rault, Acigne (FR)

(73) Assignee: France Telecom, Paris (FR)

( * ) Notice: Subject to any disclaimer, the term of this patent is extended or adjusted under 35 U.S.C. 154(b) by 1013 days.

(21) Appl. No.: 10/547,759

(22) PCT Filed: Mar. 3, 2004

(86) PCT No.: PCT/FR2004/000488

§ 371 (c)(1),
(2), (4) Date: May 19, 2006

(87) PCT Pub. No.: WO2004/081918

PCT Pub. Date: Sep. 23, 2004

(65) Prior Publication Data

US 2006/0265087 A1 Nov. 23, 2006

(30) Foreign Application Priority Data

Mar. 4, 2003 (FR) .................................. 03 02730

(51) Int. Cl.
*G10L 19/02* (2006.01)
*H04B 1/66* (2006.01)

(52) U.S. Cl. ....................... 704/201; 704/205; 704/500; 370/537

(58) Field of Classification Search ................. 704/201, 704/205, 500, 501, 502, 503; 370/469, 537, 370/542
See application file for complete search history.

(56) References Cited

U.S. PATENT DOCUMENTS

| | | | | |
|---|---|---|---|---|
| 5,864,801 | A * | 1/1999 | Sugiyama et al. | 704/229 |
| 6,023,233 | A * | 2/2000 | Craven et al. | 341/51 |
| 6,058,118 | A * | 5/2000 | Rault et al. | 370/464 |
| 6,226,616 | B1 * | 5/2001 | You et al. | 704/500 |
| 6,704,703 | B2 * | 3/2004 | Ferhaoul et al. | 704/223 |
| 7,050,972 | B2 * | 5/2006 | Henn et al. | 704/228 |
| 7,072,366 | B2 * | 7/2006 | Parkkinen et al. | 370/538 |

(Continued)

FOREIGN PATENT DOCUMENTS

EP 1 037 196 A1 9/2000

OTHER PUBLICATIONS

Jin et al., "Scalable Audio Coder Based on Quantizer Units of MDCT Coefficients", ICASSP '99. IEEE International Conference on Acoustics, Speech, and Signal Processing, Mar. 15-19, 1999, vol. 2, pp. 897 to 900.*

(Continued)

*Primary Examiner*—Martin Lerner
(74) *Attorney, Agent, or Firm*—Westman, Champlin & Kelly, P.A.; David D. Brush

(57) ABSTRACT

An audio signal encoded in the form of data is spectrally reconstructed so part of the frequency spectrum of the audio signal is decoded with a spectral band limiting encoder (i.e., a core encoder). The complementary part of the frequency spectrum of the audio signal is decoded with an extension encoder. Information representing at least one cut-off frequency of the signal decoded by the core decoder is used to select, from amongst the data to be decoded or the data decoded with the extension decoder.

21 Claims, 6 Drawing Sheets

U.S. PATENT DOCUMENTS

| | | | | |
|---|---|---|---|---|
| 7,469,206 | B2 * | 12/2008 | Kjorling et al. | 704/205 |
| 2003/0158726 | A1 * | 8/2003 | Philippe et al. | 704/203 |
| 2005/0273322 | A1 * | 12/2005 | Lee et al. | 704/212 |
| 2009/0083043 | A1 * | 3/2009 | Philippe et al. | 704/500 |
| 2009/0171672 | A1 * | 7/2009 | Philippe et al. | 704/500 |

OTHER PUBLICATIONS

Jin et al; "Scalable Audio Coder Based On Quantizer Units of MDCT Coefficients"; 1999 IEEE International Conference On Acoustics, Speech, and Signal Processing, Proceedings, Mar. 15-19, 1999; pp. 897-900; XP 010328465.

Atkinson et al; "High Quality Split Bank LPC Vocoder Operating at Low Bit Rates"; 1997 IEEE International Conference On Acoustics, Speech, and Signal Processing, Proceedings; Apr. 21-24, 1997; pp. 1559-1562; XP 010226105.

McCree et al; "An Embedded Adaptive Multi-rate Wideband Speech Coder"; 2001 IEEE International Conference On Acoustics, Speech, and Signal Processing, Proceedings; vol. 2 of 6; May 7-11, 2001; pp. 761-764; XP002231188.

* cited by examiner

METHOD AND DEVICE FOR SPECTRAL RECONSTRUCTION OF AN AUDIO SIGNAL

RELATED APPLICATIONS

The present application is the national phase of PCT/FR2004/000488, filed Mar. 3, 2004, and claims priority to France Application Number 03/02730, filed Mar. 4, 2003, the disclosure of which is hereby incorporated by reference in its entirety.

FIELD OF INVENTION

The present invention concerns a method and a device for encoding and decoding an audio signal using spectrum reconstruction techniques.

More particularly, the invention relates to improving the decoding of an audio signal encoded by a spectral band limiting encoder, referred to as a core encoder.

BACKGROUND ART

In the prior art of audio signal transmission, it is well known to carry out, before transmission, an operation of encoding an original signal. As for the received signal, this undergoes a reverse decoding operation. This encoding can be a bit rate reduction encoding. Known bit rate reduction encoders are for example transform type encoders such as the MPEG1, MPEG2 or MPEG4-GA encoders, CELP type encoders and even parametric type encoders, such as a parametric MPEG4 type encoder.

In bit rate reduction audio encoding, the audio signal must often undergo passband limiting when the bit rate becomes low. This passband limiting is necessary in order to avoid the introduction of audible quantization noise in the encoded signal. It is then desirable to complete the spectral content of the original signal as far as possible.

Band widening is known in the prior art, such as for example the spectral widening method known by the name HFR (High-Frequency Regeneration) method. The decoded low-frequency signal, with limited band, is subjected to a non-linear device in order to obtain a signal enriched with harmonics. This signal, after whitening and shaping based on information describing the spectral envelope of the full-band signal before encoding, allows the generation of a high-frequency signal corresponding to the high-frequency content of the signal before encoding.

Digital audio encoding systems which use high-frequency spectrum reconstruction techniques at encoder level as well as at decoder level are also known.

These systems perform an adaptation over time of the cut-off frequency between the low-frequency band encoded by an encoder, referred to as the core encoder, and the high-frequency band encoded by an HER system, referred to as a band extension encoder.

In this case, the core encoder and the band extension encoder share the passband according to the adapted cut-off frequency.

This type of system is particularly advantageous for encoding audio signals.

Certain communication networks such as the Internet, wireless communication networks and others do not guarantee a perfect routing of data between the sender and the addressee. Some data may thus never arrive at the addressee or arrive there to late. In arriving too late, the addressee considers them as lost.

In these networks, the passband available for routing the data also continuously varies considerably.

In other networks, such as radio networks, some of the data amongst the transmitted data have a higher priority than others. Highly effective error-correcting codes are associated with these, ensuring correct decoding, and therefore no transmission losses. Others, on the other hand, are less important and lower-performance error-correcting codes, perhaps even none, are associated with them. The latter data are subject to the hazards of the network and decoding might well not be achievable.

In certain encoding systems such as those used in the MPEG4 standard, it may be, following transmission errors, that the signal of a certain frequency band of the spectrum of the encoded signal can no longer be decoded, these frequency components then being lost.

Thus, even if the encoding of the audio signal has been performed in the best possible manner, the decoding of signals transmitted on such networks comprises a number of faults related to these networks.

SUMMARY OF THE INVENTION

An aspect of the invention attempts to solve the drawbacks of the prior art by proposing a method of encoding an audio signal, in which part of the frequency spectrum of the audio signal is encoded with a spectral band limiting encoder referred to as a core encoder and in which the complementary part of the frequency spectrum of the audio signal is encoded with an extension encoder, characterised in that at least part of the spectrum encoded by the core encoder is also encoded with the extension encoder.

Thus, at least part of the audio signal is encoded by both encoders, which guarantees correct reception of the signal, even if the latter passes through a network in which some data may be lost or erroneous.

Correlatively, an aspect of the invention proposes a device for encoding an audio signal, in which part of the frequency spectrum of the audio signal is encoded with a spectral band limiting encoder referred to as a core encoder and in which the complementary part of the frequency spectrum of the audio signal is encoded with an extension encoder, wherein the device comprises means for encoding at least part of the spectrum encoded with the core encoder with the extension encoder.

More precisely, determination of at least one cut-off frequency of the core encoder is performed.

Thus, the cut-off frequency of the core encoder can be adapted to the operating conditions of the core encoder.

More particularly, in one embodiment the encoded digital signal is transferred over a network and the or each determined frequency is transferred with the encoded digital signal.

Thus, the decoder can process this information quickly by reading it from the encoded digital signal.

More particularly, the core encoder is a hierarchical encoder and, for each encoding layer, at least one cut-off frequency of each encoding layer is determined.

Thus, for each encoding layer of the core encoder, the cut-off frequency of the core encoder can be adapted to the operating conditions of the core encoder.

More precisely, each encoding layer of the encoded digital signal is transferred over a network and the or each frequency determined for the layer is transferred with said layer.

Thus, the decoder has all the information available quickly. No special processing of the decoded signal is then necessary.

More precisely, the part of the spectrum encoded with the core encoder and the extension encoder is determined.

Thus, the part of the audio signal encoded by both encoders can change over time and for example take account of the conditions of the network.

More precisely, the part of the frequency spectrum of the audio signal encoded with the core encoder is the low part of the frequency spectrum of the audio signal.

The invention also concerns a method for spectral reconstruction of an audio signal encoded in the form of data, in which part of the frequency spectrum of the audio signal is decoded with a spectral band limiting decoder referred to as a core decoder and in which the complementary part of the frequency spectrum of the audio signal is decoded with an extension decoder, characterised in that the method comprises:

- a step of obtaining information representing at least one cut-off frequency of the signal decoded by the core decoder;
- a step of selecting, from amongst the data to be decoded or the data decoded with the extension decoder, data relevant for the decoding according to the information obtained.

Correlatively, the invention proposes a device for spectral reconstruction of an audio signal encoded in the form of data in which part of the frequency spectrum of the audio signal is decoded with a spectral band limiting decoder referred to as a core decoder and in which the complementary part of the frequency spectrum of the audio signal is decoded with an extension encoder, characterised in that the device comprises:

- means for obtaining information representing at least one cut-off frequency of the signal decoded by the core decoder;
- means for selecting, from amongst the data to be decoded or the data decoded with the extension decoder, data relevant for the decoding according to the information obtained.

Thus, the decoded signal will be of better quality, no spectral component of the signal being absent, the frequency spectrum decoded with the extension decoder being modified in accordance with the cut-off frequency of the signal decoded by the core decoder.

More particularly, the part of the frequency spectrum of the audio signal decoded with a core decoder is the low part of the frequency spectrum of the audio signal.

Advantageously, the information representing at least one cut-off frequency of the signal decoded by the core decoder is obtained by making an evaluation of the high cut-off frequency of the signal decoded by the core decoder.

Thus, it is not necessary to include additional information in the encoded and transmitted signal, and less information passes over the network.

More particularly, the core decoder is a hierarchical decoder and information representing the passband of the signal decoded by the core decoder is obtained for each layer of the decoded signal.

Advantageously, the information representing at least one cut-off frequency of the signal decoded by the core decoder is obtained from information included in the data stream comprising the encoded digital signal.

Thus, the processing speed at the decoder is increased, whilst simplifying the latter.

More particularly, the core decoder is a hierarchical decoder and information representing the passband of the signal decoded by the core decoder is obtained for each layer of the decoded signal.

Thus, the decoder can adapt the processing to each encoding layer; the decoder has this information available at each layer and can thus modify the frequency spectrum decoded with the extension decoder according to this information.

Correlatively, an aspect of the invention proposes deriving a signal of data representing an encoded audio signal, in which part of the frequency spectrum of the audio signal is encoded with a spectral band limiting encoder, referred to as a core encoder, and in which the complementary part of the frequency spectrum of the audio signal is encoded with an extension encoder, wherein the signal comprises part of the spectrum encoded with the core encoder and with the extension encoder.

Advantageously, the signal also comprises information representing at least one cut-off frequency of the core encoder or of the extension encoder.

An aspect of the invention also concerns the computer program stored on a data medium, said program comprising instructions making it possible to implement the processing method described previously, when it is loaded and executed by a computer system.

The characteristics of the invention mentioned above, as well as others, will emerge more clearly from a reading of the following description of an example embodiment, said description being given in connection with the accompanying drawings.

DETAILED DESCRIPTION OF THE DRAWING

Figure 1A:
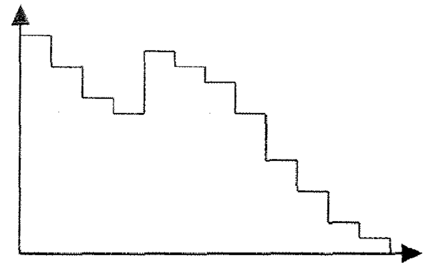
FIGS. 1*a* to 1*d* depict the various frequency spectra of an audio signal encoded with a prior art core encoder and an extension encoder.
Figure 1B:
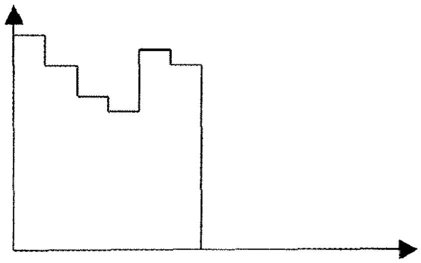

FIG. 1*a* depicts a frequency spectrum of an audio signal which is to be encoded. In accordance with the encoders using combinations of encoders such as the core encoder/extension encoder association, the low frequencies of the spectrum (FIG. 1*b*) are encoded by a core encoder, whilst the high frequencies are encoded by an extension encoder. This part of the high frequencies is depicted in FIG. 1*c*.

Figure 1E:
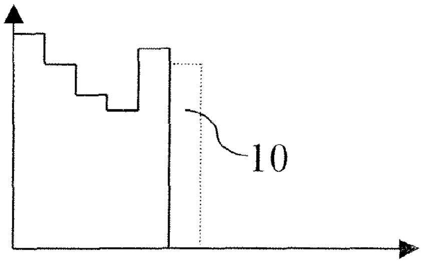
FIGS. 1*e* to 1*g* depict the various frequency spectra of an audio signal transmitted over a network and decoded with a prior art core decoder and an extension decoder.
Figure 1C:
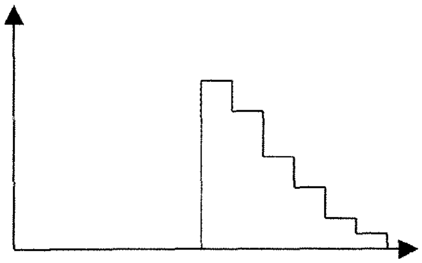
Figure 1F:
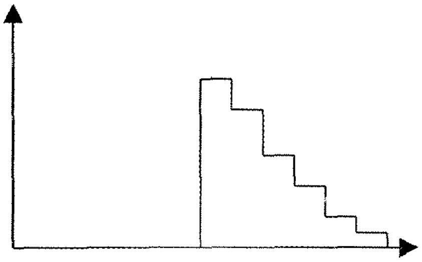
Figure 1D:
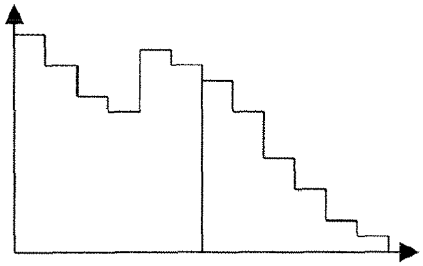

Combining the high and low frequencies then gives a total spectrum depicted in FIG. 1*d* which is identical or else similar to the spectrum of FIG. 1*a*.

When such an encoded audio signal is transmitted over a network, some data amongst all the transmitted data are lost.

This is for example the case of certain encoding systems such as those used in the MPEG4 standard. Following transmission errors, it is no longer possible to decode the signal from a certain frequency of the spectrum of the encoded signal. The information representing the components of the frequency spectrum above this frequency are then considered as lost.

FIG. 1*e* depicts the frequency spectrum of an audio signal decoded with a core decoder, the encoded audio signal having been transmitted over a network and some data 10 have been lost.

This type of loss is a particular nuisance for the information encoded by the core encoder. The absence of the data 10 constitutes a hole in the spectrum of the decoded frequencies and this hole creates significant noise such as hissing upon restoration of the sound signal.

The items of information encoded by the extension encoder are much more limited as regards their number.

They are either included with the data encoded by the core encoder, or transmitted independently.

In the example here, the frequency spectrum of an audio signal transmitted over a network and decoded with an extension decoder is considered to be correct. This is depicted in FIG. 1*f*.

Figure 1G:
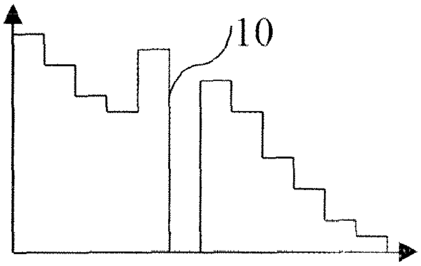
Fig.1g (PRIOR ART)

Reconstruction of the audio signal respectively by the core decoder and the extension decoder reveals in FIG. 1*g* a frequency spectrum comprising frequency components 10 which have disappeared.

These frequency components 10 which have disappeared considerably mar the reproduction quality of the audio signal.

Figure 2A:
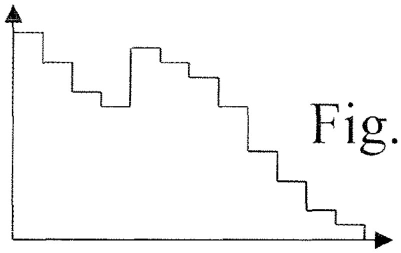
FIGS. 2*a* to 2*e* depict the various frequency spectra of an audio signal encoded with a prior art hierarchical core encoder and an extension encoder.

FIG. 2*a* depicts the frequency spectrum of the total audio signal which is to be encoded by a hierarchical core encoder and an extension encoder.

A hierarchical core encoder will successively encode different sub-parts of the frequency spectrum of the audio signal to be encoded.

Figure 2B:
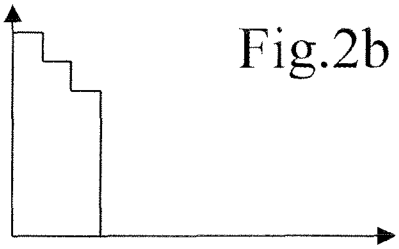
Figure 2C:
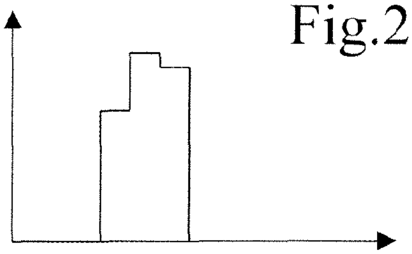

A first part of the spectrum, for example the part containing the lowest frequency components, such as the spectrum depicted in FIG. 2*b*, will be encoded. This is referred to as the first layer. Next, another part containing additional frequency components will be encoded. This is the second layer, and is depicted in FIG. 2*c*.

Thus, in such audio data transmission systems, the information representing the lowest frequencies is generally transmitted in the first layers. The other layers are, for example, then transmitted in an order which is a function of the frequencies of the spectrum which they represent.

In radio type data distribution networks, certain layers amongst the transmitted layers have higher priority than others. In general, the layers comprising the lowest frequencies are considered as having priority, and the layers comprising the highest frequencies are considered as having lowest priority.

With the layers comprising the lowest frequencies there are associated highly effective error-correcting codes, ensuring correct decoding, and therefore no transmission losses.

Less effective error-correcting codes are associated with the layers comprising the highest frequencies. The latter are subject to the hazards of the network and decoding might well not be achievable.

Figure 2D:
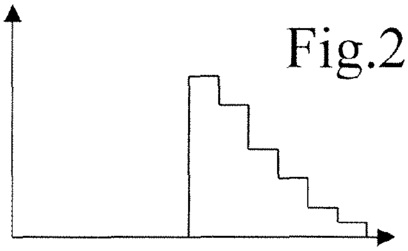

FIG. 2*d* depicts the part of the spectrum allocated to the band extension encoder; it is identical to that described in FIG. 1*c*.

Figure 2E:
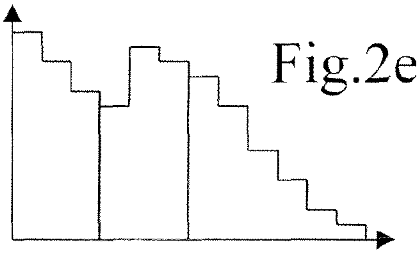

Combining the three spectra of FIGS. 2*b*, 2*c* and 2*d* then gives a total spectrum depicted in FIG. 2*e* which is identical or else similar to the spectrum of FIG. 2*a*.

Figure 2F:
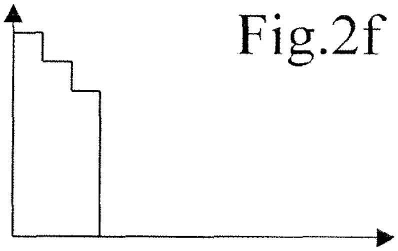
FIGS. 2*f* to 2*i* depict the various frequency spectra of an audio signal transmitted over a network and decoded with a prior art hierarchical core decoder and an extension decoder.
Figure 2G:
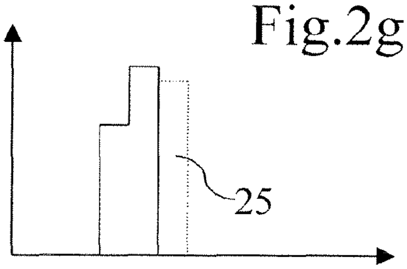

FIGS. 2*f* and 2*g* depict the frequency spectra of an audio signal decoded with a hierarchical core decoder comprising two layers of hierarchy, the encoded audio signal having been transmitted over a network and certain layers of which have been lost.

During transmission of the first layer, the spectrum equivalent to this layer has not been marred by transmission errors, as depicted in FIG. 2*f*.

Data have been lost during transmission of the second layer; the spectrum equivalent to this layer comprises frequency components, 25 in FIG. 2*g*, which are absent.

Figure 2H:
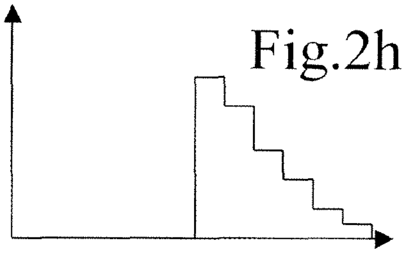

The part of the spectrum allocated to the band extension encoder is identical to that described in FIG. 1*c*. It is depicted in FIG. 2*h*.

Figure 2I:
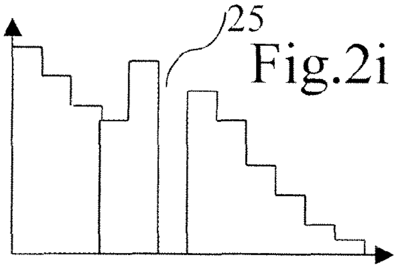
Fig.2i (PRIOR ART)

Thus, reconstruction of the audio signal respectively by the core hierarchical decoder and the extension decoder reveals in FIG. 2*i* a frequency spectrum comprising frequency components 25 which have disappeared.

Figure 3A:
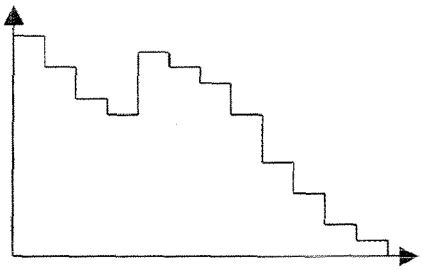
FIGS. 3*a* to 3*c* depict the various frequency spectra of an audio signal encoded with a core encoder and an extension encoder according to preferred embodiments of the invention.

FIG. 3*a* depicts the frequency spectrum of the total audio signal which is to be encoded by a core encoder and an extension encoder according to the preferred embodiments of the invention.

Figure 3B:
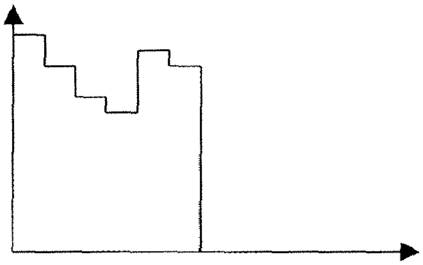

The core encoder encodes the low-frequency components of the frequency spectrum of the audio signal. This is depicted in FIG. 3*b*.

Unlike the prior art, and according to the invention, the extension encoder encodes not only the high-frequency components of the frequency spectrum of the audio signal to be encoded but also a part 30 of the low-frequency components that the core encoder encodes. These components are depicted in FIG. 3*c*.

Figure 3D:
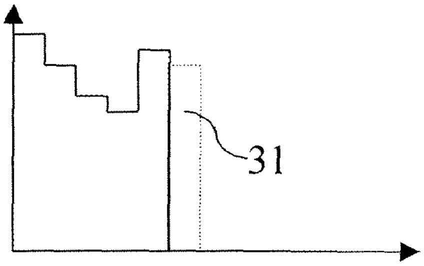
FIGS. 3*d* to 3*f* depict the various frequency spectra of an audio signal transmitted over a network and decoded with a core decoder and an extension decoder according to preferred embodiments of the invention.
Figure 3C:
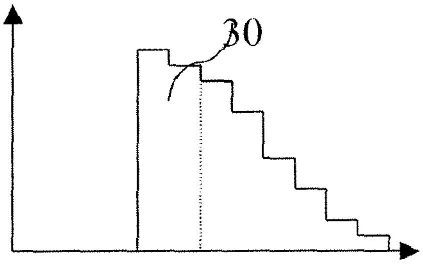

FIG. 3*d* depicts the frequency spectrum of an audio signal decoded with a core decoder, the encoded audio signal having been transmitted over a network and certain layers 31 of which have been lost.

An evaluation of the passband of the audio signal decoded by the core decoder is made; if it is different from that expected, the core decoder informs the extension decoder of the missing passband.

The extension decoder, with this information, adapts the decoding so that decoding is also applied to the missing passband.

Figure 3E:
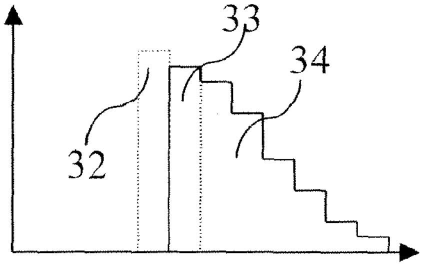

FIG. 3*e* depicts the frequency spectrum equivalent to the encoded information received by the extension decoder. This spectrum consists of the components 32, 33 and 34.

If no transmission error related to variation in passband of the network or transmission errors has occurred, the information corresponding to the component 34 is sufficient for the decoding.

If the passband of the network has veiled or transmission errors have occurred such that the component 31 of FIG. 3*d* is lost, the information corresponding to the components 33 and 34 is necessary for the decoding.

Figure 3F:
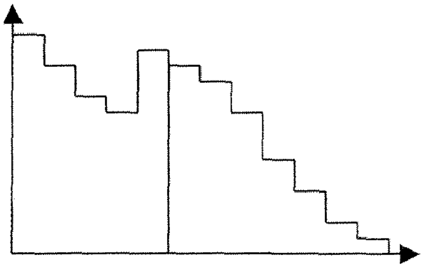

Thus, reconstruction of the audio signal respectively by the core hierarchical decoder and the extension decoder reveals in FIG. 3*f* a frequency spectrum no longer comprises any missing frequency components. Thus, even when the network has large passband variations, the decoded audio signal remains of high quality.

Figure 4A:
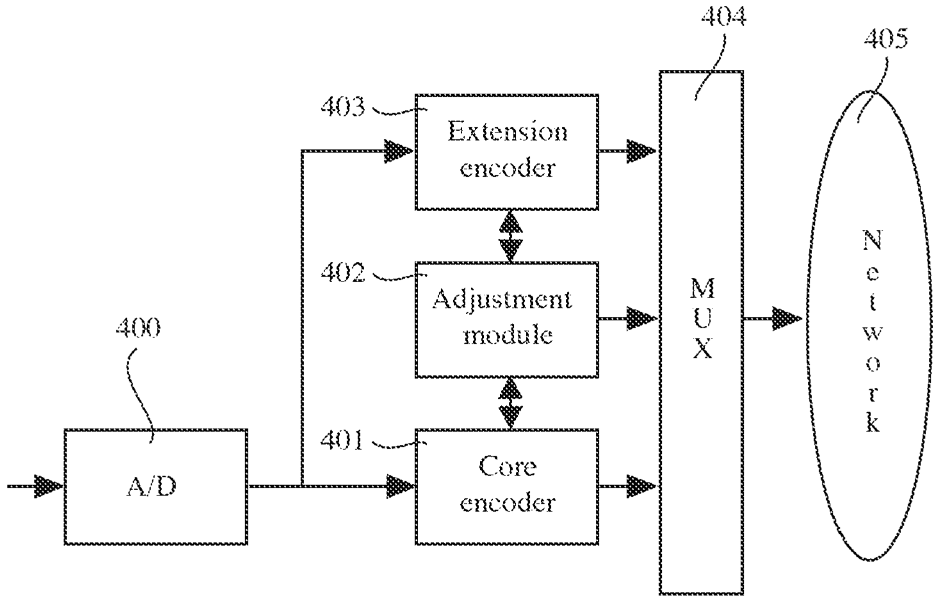
FIG. 4*a* depicts a block diagram describing the encoding device according to a preferred embodiment of the invention.

FIG. 4*a* depicts a block diagram describing the encoding device according to one preferred embodiment of the invention.

The encoding device consists of an analogue-to-digital converter 400 which converts the analogue signal to be encoded into a digital signal. Of course, if the data are already in digital form, the analogue-to-digital converter is not necessary.

The digital signal is delivered to the core encoder 401 which encodes this signal. The core encoder 401 is, for example, a bit rate reduction encoder such as conforming to one of the MPEG1, MPEG2 or MPEG4-GA standards, or a CELP type encoder, a hierarchical encoder, perhaps even a parametric MPEG4 encoder.

The output of the core encoder represents the data of the signal covering the frequency spectrum such as that depicted in FIG. 3*b*.

This same digital signal is delivered to the band extension encoder 403. The band extension encoder is, for example, an HFR (High-Frequency Regeneration), for example an SBR (Spectral Band Replication), type encoder such as described in the document "Audio Engineering Society, convention paper 5553", presented at the $112^{th}$ AES convention by Mr Martin Dietz.

The output of the band extension encoder represents the data of the envelope of the signal covering the frequency spectrum such as that depicted in FIG. 3*c*.

A cut-off frequency adjustment module 402 is connected to the band extension encoder 403 and to the core encoder 401.

This module 402 defines the frequency spectrum that the extension encoder takes into account for the encoding operation.

This module 402 determines this spectrum according to the high cut-off frequency of the core encoder 401 and a variable frequency band which allows the decoder according to an aspect of the invention to be able to overcome the possible transmission losses.

For example, in the case of use of a hierarchical encoder and transmission with error-correcting codes whose robustness is variable according to the layers transmitted, the variable frequency band is adjusted to guarantee correct recomposition of the signal for layers not having a robust error-correcting code.

It should be noted that, in a variant, the frequency spectrum of the core encoder 401 can be adjusted from the frequency spectrum of the extension encoder 403.

In this case, the module 402 defines the frequency spectrum that the core encoder 401 takes into account for the encoding. This module 402 defines this spectrum according to the low cut-off frequency of the extension encoder 403 and a variable frequency band which allows the decoder according to an aspect of the invention to be able to overcome the possible transmission losses.

The encoding device also comprises a multiplexer 404 which multiplexes the audio signals encoded by the core encoder 401 and by the extension encoder 403.

According to a variant of FIG. 4*a*, the module 402 transfers to the multiplexer 404 the information representing the passband of the core encoder 401 or its cut-off frequencies, perhaps even the low cut-off frequency of the extension encoder 403, so that this information is included in the transmitted data.

The inclusion is performed in the case of a hierarchical encoder for each encoding layer.

The multiplexed data are then transferred to a network transmission module which, for example in the case of a radio transmission, applies error-correcting codes to the multiplexed data and transmits the latter over the network 405.

Figure 4B:
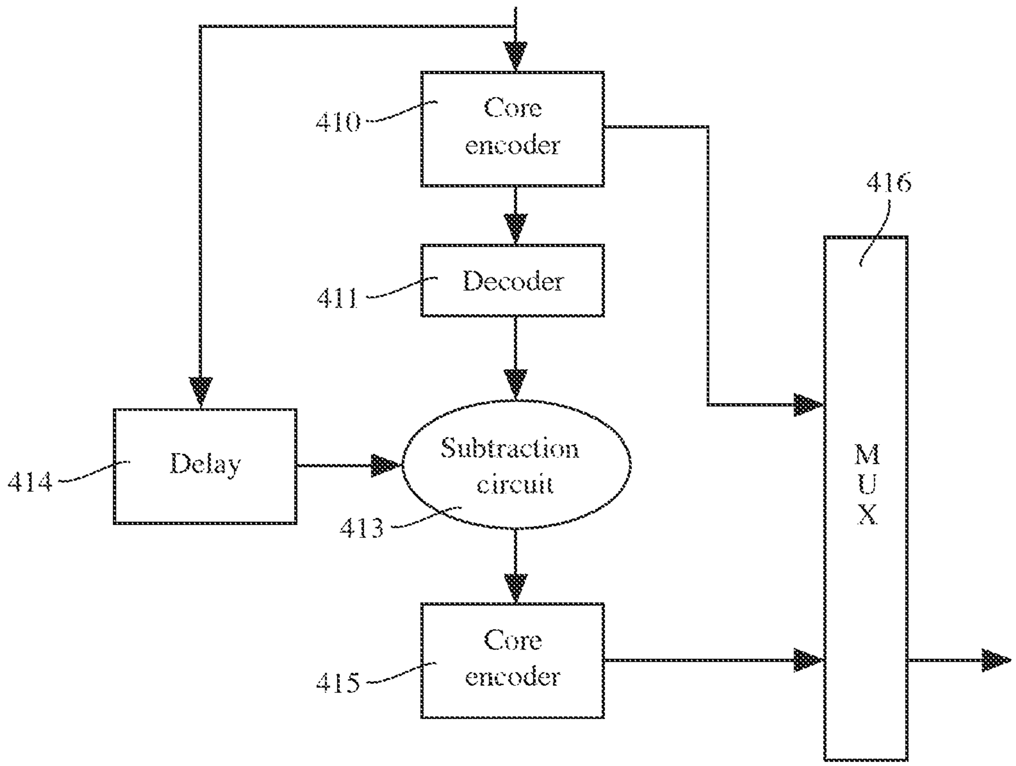
FIG. 4*b* depicts a block diagram describing the main elements of a core hierarchical encoder according to a preferred embodiment of the invention.

FIG. 4*b* depicts a block diagram describing the main elements of a core hierarchical encoder.

This hierarchical encoder can replace the encoder 401 described previously with reference to FIG. 4*a*.

A core hierarchical encoder usually subdivides the frequency spectrum to be encoded into different layers. A layer represents a frequency band of the spectrum to be encoded. The number of layers is variable and allows a progressive transmission of the encoded signal.

For the sake of simplicity, only two layers are depicted here. The encoder consists of a first encoder 410 which encodes the lowest part of the frequency spectrum of the original signal.

The encoded information is transferred to a multiplexer 416 which transfers these data to the multiplexer 404.

It should be noted that the module 402 described previously transfers to the multiplexer 404 the information representing the passband of the core encoder 410 so that this is included in the data stream associated with this layer.

This then constitutes the first layer of the encoded signal.

The encoded information is also transferred to a decoder 411. This decoder decodes this information in order to next transmit it to a subtraction circuit 413 which will subtract the decoded signal from the original signal.

It should be noted that the original signal has previously been delayed 414 by a time period equal to the encoding time of the encoder 410 and the decoding time of the decoder 411.

The signal obtained at the output of the subtraction circuit is then the original signal from which the previously encoded low-frequency components have been removed except for the remainder of the encoding.

This signal is again encoded by an encoder 415 which may be of the same type as the encoder 410. Here, the frequency components of the signal which are above those encoded by the encoder 410 are encoded.

The encoded information is transferred to a multiplexer 416 which transfers these data to the multiplexer 404.

It should be noted that the module 402 described previously transfers to the multiplexer 404 the information representing the passband of the core encoder 415 so that this is included in the data stream associated with this layer. It may also transfer the total number of encoding layers, or the high or low cut-off frequency of the core encoder 415.

This then constitutes the second layer of the encoded signal.

It should be noted that, if it is wished to increase the number of layers, the elements 410, 411, 413 and 414 must be duplicated for each additional layer.

It should also be noted that the frequency spectrum processed by each encoder can be variable.

It should also be noted that the input data can be monophonic, stereophonic or multi-channel audio signals.

In the case of multi-channel signals, the passband information transmitted by the encoder can be transmitted in a combined manner or, in a preferential mode, the passband of each channel can be deduced from the other channels by differential encoding.

Figure 5:
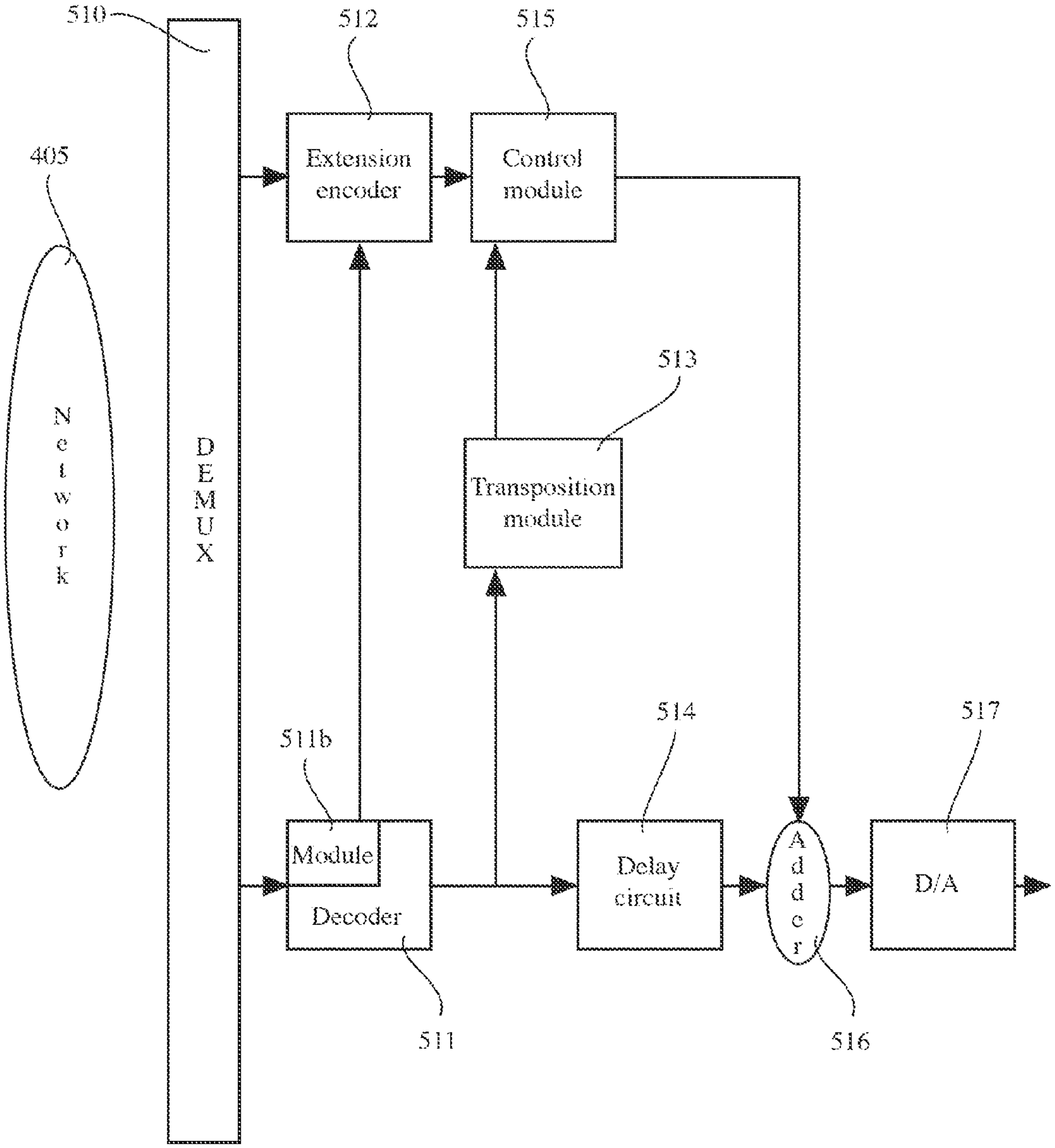
FIG. 5 depicts a block diagram describing the decoding device according to a preferred embodiment of the invention.

FIG. 5 depicts a block diagram describing the decoding device according to a preferred embodiment of the invention.

The decoding device includes a demultiplexer 510 which separates the signals received by means of the network 405 into data intended for the core decoder 511 and data intended for the extension decoder 512. Multiplexer 510 also extracts, from the received signals, the information representing the passband of the core encoder 401 of the encoding device., of the encoders 410 and 415 if the signal was encoded with a hierarchical encoder, perhaps even the low cut-off frequency of the extension encoder 403 of the encoding device, if these were included in the transmitted data.

The core decoder 511 decodes the data in order to supply a decoded signal such as the signal depicted in FIG. 3*d*.

The core decoder 511 is, for example, a decoder such as conforming to one of the MPEG1, MPEG2 or MPEG4-GA standards, or a CELP type decoder, a hierarchical decoder, perhaps even a parametric/MPEG4 decoder.

The core decoder 511 comprises a module 511*b* for obtaining information representing at least one cut-off frequency which evaluates, according to a first embodiment, the frequency spectrum of the signal received thereby. The module 511*b* performs this evaluation, for example, by performing a time-frequency transformation on the decoded signal and determining the frequency from which the energy of the signal becomes negligible. Preferably, this is performed with the assistance of a perception model.

The decoder 511, more precisely its module 511*b*, next transfers an item of information representing the cut-off frequency or the passband to the extension decoder 512.

The extension decoder 512 selects, using the representative item of information transmitted by the decoder 511, from amongst the encoded data it has received from the multiplexer 510, the data corresponding to a representation of the spectral envelope above the frequency determined by the encoder 511.

In this way, the losses related to the transmission of the encoded signal are compensated for.

The core decoder 511, more precisely the module 511*b* for obtaining information representing at least one cut-off frequency, obtains from the demultiplexer 510, according to a second embodiment, the information representing the passband of the core encoder 401 or of the encoders 410 and 415 of the encoding device, or perhaps the number of layers of the encoded signal, perhaps even the low cut-off frequency of the extension encoder 403 of the encoding device, if these were included in the transmitted data.

Using these obtained data, the module 511*b* checks, in the case where the latter is a hierarchical decoder, whether each layer has been correctly received and, if not, transfers an item of information representing the passband of one or more lost layers to the extension decoder 512.

The extension decoder 512 selects, using the representative item of information transmitted by the module 511*b*, from amongst the encoded data received from the multiplexer 510, the data corresponding to the envelope of the signal corresponding to a representation of the spectral envelope of the frequencies above the lowest frequency corresponding to the lost frequency bands.

Thus, the extension decoder corrects the losses due to the network whether concerning losses affecting the last layers received or losses affecting an intermediate layer.

The band extension decoder 512 is for example an HFR (High-Frequency Regeneration) type decoder, for example an SBR (Spectral Band Replication) type decoder such as described in the document "Audio Engineering Society, convention paper 5553", presented at the 112$^{th}$ AES convention by Mr Martin Dietz.

It should be noted that, in a variant, the extension decoder 512 decodes all the information received. A selection from amongst the decoded data is performed so as to keep only those corresponding to a representation of the spectral envelope above the frequency determined by the encoder 511.

The envelope decoded by the extension decoder 512 or selected is transferred to a gain control module 515.

The signal decoded by the core decoder 511 is sent to a transposition module 513 which generates a signal in the high frequencies of the spectrum from the low-frequency decoded signal.

This signal is introduced into the gain control module 515 in order to allow adjustment of the high-frequency signal envelope.

The adjusted envelope signal is then added to the signal decoded by the core decoder 511 with an adder 516.

The adder 516 can, in a preferred embodiment, favor certain frequency components by multiplying, for example, certain components by coefficients.

It should be noted that the signal decoded by the core decoder 511 has previously been delayed by a time period equal to the difference in processing time between the added signals. This delay is performed by the delay circuit 514.

The frequency spectrum of the signal obtained is thus similar to that of FIG. 3*f*.

The summation signal can next be converted into analogue form by means of a digital-to-analogue converter 517.

Figure 6:
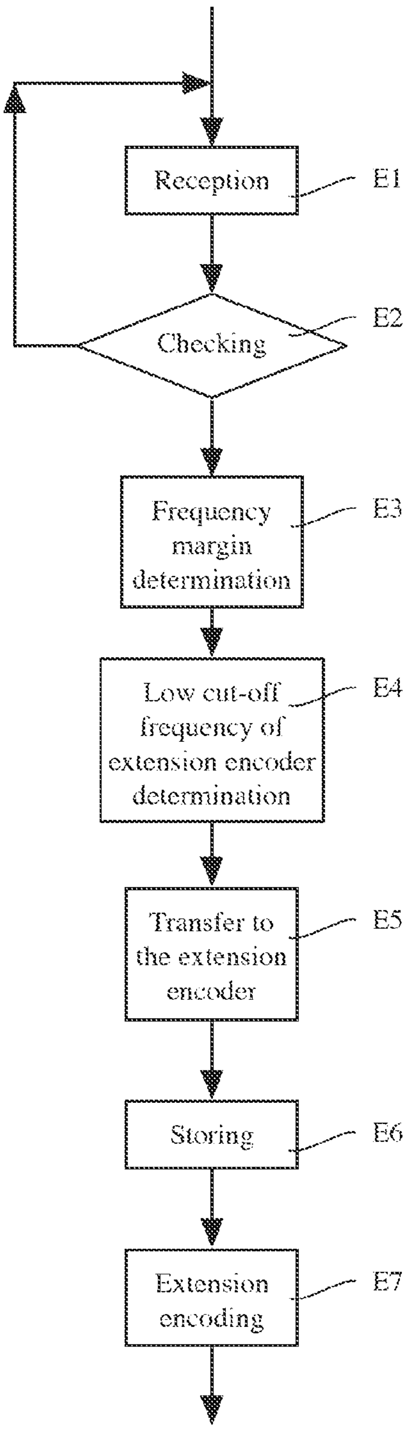
FIG. 6 depicts, according to a preferred embodiment of the invention, the algorithm performed at encoder level.

FIG. 6 depicts the algorithm performed according to a preferred embodiment of the invention at the encoder. The structure and method as described with reference to the preceding figures can also be implemented in software form in which a processor executes the executable code associated with the steps E1 to E7 of the algorithm of FIG. 6.

Upon power-up of the encoding device, and more particularly in the case of use of a computer as the encoding device, the processor reads, from the read-only memory of the computer or from a data medium such as a compact disk (CD-ROM), the instructions of the program corresponding to the steps E1 to E7 of FIG. 6 and loads them into random access memory (RAM) in order to execute them.

At the step E1, upon receipt of audio data to be encoded, the processor determines the passband of the core encoder or at least one cut-off frequency.

It should be noted that the passband of the core encoder may or may not be variable over time depending for example on the load of the core encoder.

At this same step, the processor encodes the data according to a so-called core encoding algorithm conforming to one of the MPEG1, MPEG2 or MPEG4-GA standards, or of CELP type of hierarchical type, perhaps even of parametric MPEG4 type.

The step E2 consists of checking whether, and in the case of hierarchical encoding, all the layers have been encoded or not.

If not, and if the core encoding is a hierarchical encoding, the processor reiterates the step E1 for each layer of the encoded audio signal.

If all the layers have been encoded, or if the encoding is not a hierarchical encoding, the algorithm goes to the next step E3.

At the step E3, the processor determines a frequency margin. This margin may be predetermined and stored in a register or be in the form of a variable.

This variable depends, for example, on the type of error correction which will be applied to the encoded data during transmission thereof over the network.

This margin having been determined, the processor determines, at the step E4, from the margin and the high cut-off frequency of the core encoder, the low cut-off frequency of the extension encoder.

This operation having been carried out, the processor transfers this information to the extension encoding subroutine at the step E5.

Finally, at the step E6, the processor stores this information.

The processor, at the step E7, executes the extension encoding by encoding the data whose spectrum is above the information transferred at the step E5. The band extension encoding is for example an encoding of the HFR (High-Frequency Regeneration), for example SER (Spectral Band Replication), type such as described in the document "Audio Engineering Society, convention paper 5553", presented at the $112^{th}$ AES convention by Mr Martin Dietz.

This operation having been performed, the processor goes to the step E7 which consists of multiplexing the audio signals encoded at the step E1 and the audio signals encoded at the step E7 in order to form a stream of data encoded and transmitted over a network.

According to a variant of the operations illustrated in FIG. 6, the processor inserts, into the encoded and transmitted data stream, the information stored at the step E6 or inserts one or more of the following items of information: passband of the core encoder, passband of the extension encoder, low and high frequency of each encoding layer, number of encoding layers if a hierarchical encoder is used.

The insertion is performed in the case of a hierarchical encoder for each encoding layer.

These operations having been performed, the processor returns to the step E1 awaiting new audio data to be encoded.

Figure 7:
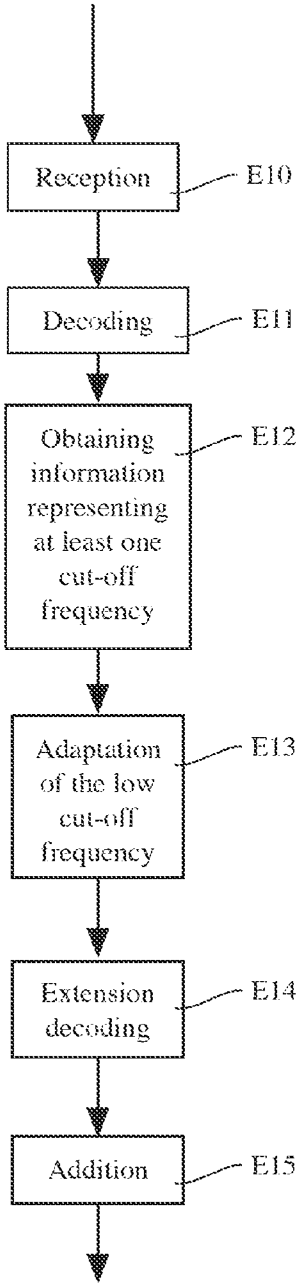
FIG. 7 depicts, according to a preferred embodiment of the invention, the algorithm performed at decoder level.

FIG. 7 depicts the algorithm performed according to a preferred embodiment of the invention at the decoder.

The invention as described with reference to the preceding figures can also be implemented in software form in which a processor executes the code associated with the steps E10 to E15 of the algorithm of FIG. 7.

Upon power-up of the receiving device, and more particularly in the case of use of a computer as the receiving device, the processor reads, from the read-only memory of the computer or from a data medium such as a compact disk (CD-ROM), the instructions of the program corresponding to the steps E10 to E15 of FIG. 7 and loads them into random access memory (RAM) in order to execute them.

At the step 610, the processor, upon receiving audio data to be decoded, separates the signals received by means of the network 405 into data intended for the core decoder and data intended for the extension decoder. It also extracts, from the received signals, the information representing the passband or at least one cut-off frequency of the core encoder which encoded the audio signal, or of the encoders which encoded the audio signal if the signal was encoded with a hierarchical encoder, perhaps even the low cut-off frequency of the extension encoder which encoded the audio signal, if these were included in the transmitted data.

This operation having been performed, the processor goes to the step E11. The processor then carries out the decoding of these data.

The processor carries out the decoding of the data according to a so-called core decoding algorithm such as conforming to one of the MPEG1, MPEG2 or MPEG4-GA standards, or of CELP type, a hierarchical decoding, perhaps even a parametric MPEG4 type decoding.

This core decoding step having been performed, the processor goes to the step E12 which is a step of obtaining information representing at least one cut-off frequency which evaluates, according to a first embodiment, the frequency spectrum of the signal received thereby. This is carried out for example by performing a time-frequency transformation on the signal decoded at the step E11 and determining the frequency from which the energy of the signal becomes negligible. Preferably, this can be performed with the assistance of a perception model.

According to another embodiment, the processor obtains the information extracted at the step E1 and, in the case where the latter is a hierarchical decoder, checks whether each layer has been correctly received and if not transfers an item of information representing the passband of one or more lost layers to the extension decoder.

This operation having been performed, the step E13 consists of an adaptation of the low cut-off frequency of the extension decoder so that the latter compensates for the losses due to the network. The adaptation is performed using the information representing the cut-off frequency or the passband obtained at the step E12 or, if the decoding of the step E11 is a hierarchical decoding, the information representing the passband or a cut-off frequency of one or more lost layers.

This operation having been performed, the processor goes to the step E14 and, according to a so-called extension decoding algorithm, decodes the data corresponding to the frequencies above this previously determined low cut-off frequency.

The processor selects, using the adapted frequency, from amongst the data separated at the step E1 and intended for the extension decoding, the data corresponding to the envelope of the signal corresponding to a representation of the spectral envelope of the frequencies above the lowest frequency corresponding to the lost frequency bands.

Thus, the extension decoding corrects the losses due to the network, whether concerning losses affecting the last layers received or losses affecting an intermediate layer.

The extension decoding is a band extension decoding algorithm for example an HFR (High-Frequency Regeneration) type decoding, for example an SBR (Spectral Band Replication) type decoding such as described in the document "Audio Engineering Society, convention paper 5553", presented at the $112^{th}$ AES convention by Mr Martin Dietz.

Finally, the data decoded by the core decoder and the extension decoder are added to form the decoded audio signal at the step E15.

These operations having been performed, the processor returns to the step E10 awaiting new audio data to be decoded.

The invention claimed is:

1. A method of encoding an audio signal, in which a first part of the frequency spectrum of the audio signal is encoded with a spectral band limiting encoder referred to as a core encoder and in which the complementary part of the frequency spectrum of the audio signal is encoded with an extension encoder, distinct from the core encoder, wherein at least a part of said first part of the spectrum encoded with the core encoder is also encoded with the extension encoder, the method comprising:

determining at least one cut-off frequency of the core encoder by an adjustment module taking into account the load of the core encoder, determining said part of said first part of the spectrum encoded with the core encoder and the extension encoder using the cut-off frequency determined by said adjustment module, said first part and complementary part overlapping in the proximity of the cut-off frequency, in order to compensate for a possible data loss during the transmission of said part of frequency spectrum encoded with the core encoder, said step of determining at least one cut-off frequency of the core encoder by an adjustment module comprising:

determining a frequency margin, said margin being predetermined and stored in a register or be in the form of a variable, from said margin, determining the high cut-off frequency of the core encoder, the low cut-off frequency of the extension encoder, delivering representative information of said low cut-off frequency of the extension encoder, transferring of said information, storing of said information.

2. The method according to claim 1, wherein the method comprises transferring the encoded digital signal over a network and transferring the or each determined frequency with the encoded digital signal.

3. The method according to claim 1, wherein the core encoder is a hierarchical encoder and, for each encoding layer, at least one cut-off frequency of each encoding layer is determined.

4. The method according to claim 3, wherein the method comprises transferring each encoding layer of the encoded digital signal over a network, transferring the or each determined frequency for the layer with said layer.

5. The method according to claim 1, wherein the part of the frequency spectrum of the audio signal encoded with the core encoder is the low part of the frequency spectrum of the audio signal.

6. A data medium storing a computer program, said program comprising instructions making it possible to implement the encoding method according to claim 1, when the program is loaded and executed by a computer system.

7. A processor arrangement arranged to perform the steps of claim 1.

8. A method of spectral reconstruction of an audio signal encoded in the form of data, comprising:

data corresponding to low frequencies components of the frequency spectrum, of the audio signal dedicated to be decoded with a spectral band limiting decoder, referred to as a core decoder;

data corresponding to a second part of the frequency spectrum, of the audio signal, comprising high frequencies components, dedicated to be decoded with an extension decoder, distinct from the core decoder, wherein said data dedicated to be decoded with an extension decoder, distinct from the core decoder, correspond to said high frequencies components and also to a part of said low frequencies components of the frequency spectrum, of the audio signal that have been coded by the core encoder, said part corresponding to a frequency margin being comprised between a low cut-off frequency of the extension encoder and a high cut-off frequency of the core encoder, and wherein the method comprises:

estimating at least one high cut-off frequency of the signal decoded by the core decoder;

adapting a low cut-off frequency of the extension decoder from said at least one high cut-off frequency, and decoding by the extension decoder of extension data corresponding to higher frequencies than said adapted low cut-off frequency.

9. The method according to claim 8, wherein the information representing at least one cut-off frequency of the signal decoded by the core decoder is obtained from information included in the data stream comprising the encoded digital signal.

10. The method according to claim 8, wherein the core decoder is a hierarchical decoder and the method obtains information representing the passband of the signal decoded by the core decoder for each layer of the decoded signal.

11. A data medium storing a computer program, said program comprising instructions making it possible to implement the audio signal reconstruction method according to claim 8, when the program is loaded and executed by a computer system.

12. A processor arrangement arranged to perform the steps of claim 8.

13. A device for encoding an audio signal, in which a first part of the frequency spectrum of the audio signal is encoded with a spectral band limiting encoder referred to as a core encoder and in which the complementary part of the frequency spectrum of the audio signal is encoded with an extension encoder, distinct from the core encoder wherein at least a part of said first part of the spectrum encoded with the core encoder is also encoded with the extension encoder, comprising:

an adjustment module taking into account the load of the core encoder for determining at least one cut-off frequency of the core encoder, means for determining said part of said first part of the spectrum encoded with the core encoder and the extension encoder using the cut-off frequency determined by the adjustment module, said first part and complementary part overlapping in the proximity of the cut-off frequency, in order to compensate for a possible data loss during the transmission of said part of frequency spectrum encoded with the core encoder, said device for encoding comprising also:

means for determining a frequency margin, said margin being predetermined and stored in a register or be in the form of a variable, means for determining the high cut-off frequency of the core encoder, the low cut-off frequency of the extension encoder, delivering representative information of said low cut-off frequency of the extension encoder, means for transferring of said information, means for storing of said information.

14. The device according to claim 13, wherein the device comprises means for transferring the coded digital signal over a network and for transferring the or each determined frequency with the encoded digital signal.

15. The device according to claim 13, wherein the core encoder is a hierarchical encoder arranged for determining, for each encoding layer, at least one cut-off frequency.

16. The device according to claim 15, wherein the device comprises means for transferring each layer of the encoded digital signal over a network and for transferring the or each frequency determined for the encoding layer with said encoding layer.

17. The device according to claim 13, wherein the part of the frequency spectrum of the audio signal encoded with the core encoder is the low part of the frequency spectrum of the audio signal.

18. A device for spectral reconstruction of an audio signal encoded in the form of data, comprising:

a spectral band limiting decoder, referred to as a core decoder able to decode data corresponding to low frequencies components of the frequency spectrum, of the audio signal;

an extension decoder, distinct from the core decoder able to decode data corresponding to a second part of the frequency spectrum, of the audio signal, comprising high frequencies components, wherein said data dedicated to be decoded with an extension decoder, distinct from the core decoder, correspond to said high frequencies components and also to a part of said low frequencies components of the frequency spectrum, of the audio signal that have been coded by the core encoder, said part corresponding to a frequency margin being comprised between a low cut-off frequency of the extension encoder and a high cut-off frequency of core encoder, said device comprising also:

means for estimating at least one high cut-off frequency of the signal decoded by the core decoder;

means for adapting a low cut-off frequency of the extension decoder from said at least one high cut-off frequency, and means for decoding by the extension decoder of extension data corresponding to higher frequencies than said adapted low cut-off frequency.

19. The device according to claim 18, wherein the information representing at least one cut-off frequency of the signal decoded by the core decoder is arranged to be obtained from information included in the data stream comprising the encoded digital signal.

20. The device according to claim 19, wherein the core decoder is a hierarchical decoder and the device is arranged for obtaining information representing at least one cut-off frequency of the signal decoded by the core decoder for each layer of the decoded signal.

21. A method of communicating an audio signal having a frequency band, from a transmitter to a receiver via a medium having a tendency to attenuate a frequency within the band and removed from the band edges to a greater extent than other frequencies in the band, the method comprising:

at the transmitter (i) encoding the audio signal so (a) a first part of the frequency spectrum of the audio signal is encoded with a spectral band limiting encoder referred to as a core encoder and (b) the complementary part of the frequency spectrum of the audio signal is encoded by an extension encoder, distinct from the core encoder, wherein at least a part of said first part of the spectrum encoded with the core encoder is also encoded with the extension encoder; (ii) determining at least one cut-off frequency of the core encoder by an adjustment module taking into account the load of the core encoder; (iii) determining said part of said first part of the spectrum encoded by the core encoder and the extension encoder using the cut-off frequency determined by said adjustment module, said first part and complementary part overlapping in the proximity of the cut-off frequency, in order to compensate for a possible data loss during the transmission of said part of frequency spectrum encoded by the core encoder, said step of determining at least one cut-off frequency of the core encoder by the adjustment module comprising:

determining a frequency margin, said margin being predetermined and stored in a registeror in the form of a variable, from said margin, determining indications of the high cut-off frequency of the core encoder, and the low cut-off frequency of the extension encoder;

transmitting from the transmitter to the receiver via the medium the indications of the high cut-off frequency of the core encoder, and the low cut-off frequency of the extension encoder and said signal encoded by the core encoder and the signal encoded by the extension encoder;

receiving at the receiver the indications of the high cut-off frequency of the core encoder, and the low cut-off frequency of the extension encoder and said signal encoded by the core encoder and the signal encoded by the extension encoder as transmitted via the medium;

at the receiver, (i) spectrally reconstructing the audio signal by decoding a spectral band limiting decoder, referred to as a core decoder, data corresponding to low frequencies components of the frequency spectrum, of the audio signal; data corresponding to a second part of the frequency spectrum, of the audio signal, comprising high frequencies components, dedicated to be decoded with an extension decoder, distinct from the core decoder, wherein said data dedicated to be decoded by the extension decoder, distinct from the core decoder, correspond to said high frequencies components and a part of said low frequencies components of the frequency spectrum, of the audio signal that have been coded by the core encoder, said part corresponding to a frequency margin being comprised between a low cut-off frequency of the extension encoder and a high cut-off frequency of the core encoder, and wherein the method comprises:

estimating at least one high cut-off frequency of the signal decoded by the core decoder;

adapting a low cut-off frequency of the extension decoder from said at least one high cut-off frequency, and decoding by the extension decoder of extension data corresponding to higher frequencies than said adapted low cut-off frequency.

* * * * *